United States Patent
Raiser

(10) Patent No.: US 7,427,450 B2
(45) Date of Patent: Sep. 23, 2008

(54) HYBRID FUEL CELL SYSTEM WITH BATTERY CAPACITOR ENERGY STORAGE SYSTEM

(75) Inventor: Stephen Raiser, Egelsbach (DE)

(73) Assignee: General Motors Corporation, Detroit, MI (US)

( * ) Notice: Subject to any disclaimer, the term of this patent is extended or adjusted under 35 U.S.C. 154(b) by 694 days.

(21) Appl. No.: 11/009,404

(22) Filed: Dec. 10, 2004

(65) Prior Publication Data

US 2006/0127704 A1 Jun. 15, 2006

(51) Int. Cl.
*H01M 8/04* (2006.01)

(52) U.S. Cl. .............................. 429/22; 429/23; 429/9; 320/101

(58) Field of Classification Search .................. 429/22, 429/23, 34, 9, 7, 122; 320/101, 104, 116, 320/166, 138; 363/15, 63; 318/139, 798; 180/65.3

See application file for complete search history.

(56) References Cited

U.S. PATENT DOCUMENTS

| 6,262,896 B1* | 7/2001 | Stancu et al. ................. 363/17 |
| 2003/0072977 A1* | 4/2003 | Speranza et al. ............... 429/9 |
| 2004/0126635 A1* | 7/2004 | Pearson ....................... 429/23 |

* cited by examiner

*Primary Examiner*—Raymond Alejandro

(57) ABSTRACT

A fuel cell system that employs a super capacitor and battery electrically coupled in series with each other and in parallel with a fuel cell stack on a power bus line. As the voltage on the power bus line changes over the operating requirements of the system, the super capacitor is charged and discharged over a relatively large voltage swing, such as an 85% SOC swing. The super capacitor equalizes or voltage matches the voltage variation on the power bus line as set by the stack voltage to the voltage of the battery. Therefore, the battery, while providing the majority of the energy and power during charge and discharge, has a relatively small defined SOC swing, which acts to maintain the battery life. The system can also include a diode electrically coupled in parallel with the super capacitor that provides reverse voltage protection and electrical power by-pass.

23 Claims, 1 Drawing Sheet

HYBRID FUEL CELL SYSTEM WITH BATTERY CAPACITOR ENERGY STORAGE SYSTEM

BACKGROUND OF THE INVENTION

1. Field of the Invention

This invention relates generally to a fuel cell system and, more particularly, to a fuel cell system that employs a battery/capacitor electrical energy storage system that eliminates the need for a DC/DC converter.

2. Discussion of the Related Art

Hydrogen is a very attractive fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines.

A hydrogen fuel cell is an electrochemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode. The work acts to operate the vehicle.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation. These conditions include proper water management and humidification, and control of catalyst poisoning constituents, such as carbon monoxide (CO).

Several fuel cells are typically combined in a fuel cell stack to generate the desired power. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

Most fuel cell vehicles are hybrid vehicles that employ a rechargeable supplemental power source in addition to the fuel cell stack, such as a DC battery or a super capacitor (also referred to as an ultra-capacitor or double layer capacitor). The power source provides supplemental power for the various vehicle auxiliary loads, for system start-up and during high power demands when the fuel cell stack is unable to provide the desired power. More particularly, the fuel cell stack provides power to a traction motor and other vehicle systems through a DC voltage bus line for vehicle operation. The battery provides the supplemental power to the voltage bus line during those times when additional power is needed beyond what the stack can provide, such as during heavy acceleration. For example, the fuel cell stack may provide 70 kW of power. However, vehicle acceleration may require 100 kW or more of power. The fuel cell stack is used to recharge the battery at those times when the fuel cell stack is able to meet the system power demand. The generator power available from the traction motor during regenerative braking is also used to recharge the battery through the DC bus line.

In the hybrid vehicle discussed above, a bi-directional DC/DC converter is typically necessary to step up the DC voltage from the battery to match the battery voltage to the bus line voltage dictated by the stack voltage and step down the stack voltage during battery recharging. However, DC/DC converters are relatively large, costly and heavy, providing obvious disadvantages. It is therefore desirable to eliminate the DC/DC converter from a fuel cell vehicle including a supplemental power source.

There have been various attempts in the industry to eliminate the DC/DC converter in fuel cell powered hybrid vehicles by providing a power source that is able to handle a large fuel cell voltage swing over the operating conditions of the fuel cell stack. In one known system, an ultra-capacitor (also referred to as a super capacitor and a double-layer capacitor) is used as the supplemental power source. However, the ultra-capacitor is limited by how much it can be discharged because of its low energy content compared to the battery. Also, the ultra-capacitor requires a power device to ramp up the capacitor voltage at system start-up. Certain types of batteries have also been used to eliminate the DC/DC converter in vehicle fuel cell systems. However, these systems were limited by the ability to discharge the battery beyond a certain level. In other words, these types of batteries would be damaged as a result of large voltage swings on the DC bus line during the operation of the system.

U.S. patent application Ser. No. 11/112,103, titled DC/DC-Less Coupling of Matched Batteries to Fuel Cells, filed Apr. 22, 2005, and assigned to the Assignee of this application, discloses a proposed system that eliminates the DC/DC converter in a fuel cell hybrid vehicle. This system employs a matched battery whose voltage output is matched to the DC bus line over its entire voltage operating range. However, in this design, the battery state of charge (SOC) swing during vehicle operation may lead to a short battery life for current state of the art batteries, such as NiMH batteries. For example, the battery SOC swing may be between 20% capacity at its lowest discharge point and 80% capacity at its highest charge point, providing a 60% SOC swing. As the battery cycles over such a large SOC swing, the life of the battery may be significantly reduced.

SUMMARY OF THE INVENTION

In accordance with the teachings of the present invention, a fuel cell system is disclosed that employs a super capacitor and battery electrically coupled in series with each other and in parallel with a fuel cell stack on a power bus line. In one embodiment, the power and energy rating of the super capacitor is significantly less than the power and energy rating of the battery, while both are rated for the same current. As the voltage on the power bus line changes as the stack voltage changes during operation of the system, the super capacitor is charged and discharged over a relatively large voltage swing, such as an 85% SOC swing. The super capacitor equalizes or matches the voltage variation on the power bus line as set by the stack voltage to the voltage of the battery. Therefore, the battery has a relatively small SOC swing, which reduces its SOC cycling and acts to maintain the battery life. The system can also include a diode electrically coupled in parallel with the super capacitor that provides reverse voltage protection for the capacitor.

Additional advantages and features of the present invention will become apparent from the following description and appended claims, taken in conjunction with the accompanying drawings.

DETAILED DESCRIPTION OF THE EMBODIMENTS

Figure 1:
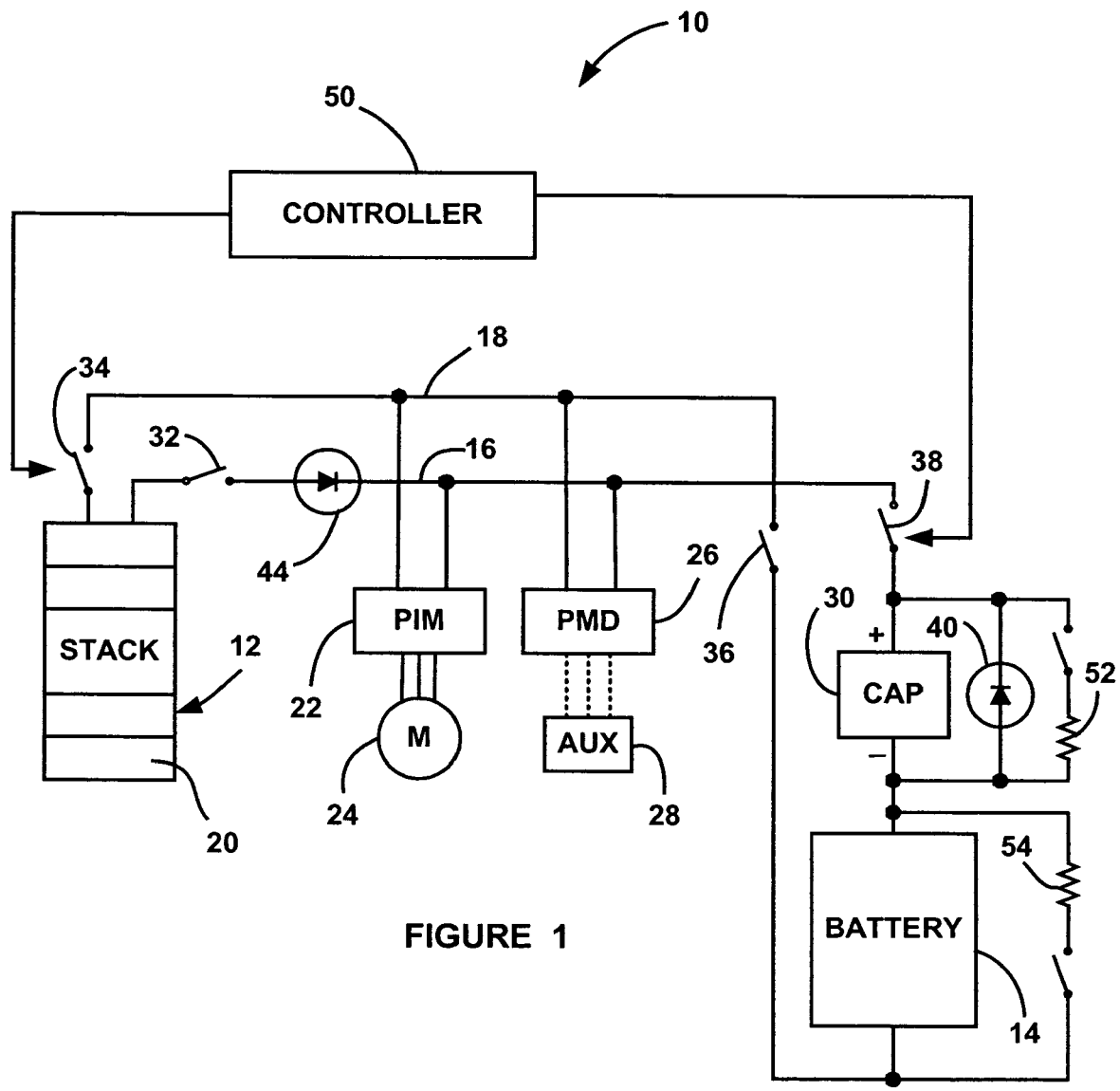
FIG. 1 is a schematic block diagram of a fuel cell system for a hybrid vehicle, where the system includes a battery and a super capacitor that provide an electrical energy storage system and eliminate the need for a DC/DC converter, according to an embodiment of the present invention.

The following discussion of the embodiments of the invention directed to a fuel cell system that employs a super capacitor and a battery is merely exemplary in nature, and is in no way intended to limit the invention or its applications or uses. For example, the fuel cell system described herein has particular application for a fuel cell hybrid vehicle. However, the fuel cell system may have other applications beyond vehicle applications.

FIG. 1 is a schematic block diagram of a fuel cell system 10 including a fuel cell stack 12 having a stack of fuel cells 20 electrically coupled in series. The fuel cell stack 12 provides electrical power to a high voltage bus line, represented here as positive bus line 16 and negative bus line 18. In a vehicle fuel cell system, the fuel cell stack 12 may include about 400 cells 20. In this application, the fuel cell stack 12 provides about 280 volts on the bus lines 16 and 18 during a full load demand, and provides about 400 volts on the bus lines 16 and 18 during a low load demand. This provides about a 120 volt swing on the bus lines 16 and 18. A switch 32 selectively disengages the positive bus line 16 from the fuel cell stack 12 and a switch 34 selectively disengages the negative bus line 18 from the fuel cell stack 12 to electrically disconnect the fuel cell stack 12 from the system 10 for safety purposes during shutdown.

According to the invention, the fuel cell system 10 includes a battery 14 and an ultra-capacitor, double layer capacitor or a super capacitor 30 electrically coupled in series to the positive bus lines 16 and 18. As will be discussed in detail below, the super capacitor 30 is discharged and charged over a relatively large SOC voltage swing (120V) on the bus lines 16 and 18 during operation of the system 10, and isolates the battery 14 from the bus voltage swing. The battery 14 and the super capacitor 30 combine to provide an electrical energy storage system (EESS) that provides additional power to the bus lines 16 and 18 during those times when the stack 12 is unable to provide the power demand, such as during heavy acceleration, and provides supplemental power to the various vehicle systems when the fuel cell stack 12 is not operating. In one example, 70 kW of power is provided by the fuel cell stack 12, and an additional 30 kW of power is provided by the combination of the battery 14 and the super capacitor 30.

The battery 14 is matched to the voltage output of the fuel cell stack 12 by appropriately selecting the battery type, the number of battery cells, the internal impedance of the battery 14 and the cell size, including Ah rating and internal resistance, so that the battery 14 will not be overcharged or overdischarged. The battery 14 can be any suitable rechargeable battery for the purposes described herein, such as a lithium ion (Li-ion) battery, a nickel-metal-hydride (NiMH) battery and a lead-acid battery. The super capacitor 30 is matched and selected to handle the fuel cell system voltage swing (cap voltage rating) and to limit the battery SOC swing (cap Farad rating).

A switch 36 selectively disengages the battery 14 and the super capacitor 30 from the negative bus line 18 and a switch 38 selectively disengages the battery 14 and the super capacitor 30 from the positive bus line 16 to electrically disconnect the battery 14 and the super capacitor 30 from the system 10 for safety purposes during shutdown. An optional by-pass diode 40 electrically coupled in parallel with the super capacitor 30 provides reverse voltage protection. Particularly, if the top terminal of the capacitor 30 begins to go more negative than the bottom terminal of the capacitor 30, then the diode 40 begins to conduct providing a current bypass around the capacitor 30.

A blocking diode 44 positioned in the positive bus line 16 prevents electrical current from flowing back into the fuel cell stack 12. The fuel cell system 10 would include various sensors and the like for monitoring the temperature of the battery 14 and the super capacitor 30, and the state of charge of the battery 14 and the super capacitor 30. A controller 50 controls the switches 32, 34, 36 and 38, as well as other system devices, consistent with the discussion herein.

The fuel cell system 10 includes a power inverter module (PIM) 22 electrically coupled to the bus lines 16 and 18 and an AC or DC traction motor 24. The PIM 22 converts the DC voltage on the bus lines to an AC voltage suitable for the AC traction motor 24. The traction motor 24 provides the traction power to operate the vehicle, as is well understood in the art. The traction motor 24 can be any suitable motor for the purposes described herein, such as an AC induction motor, an AC permanent magnet motor and an AC three-phase synchronous machine. During regenerative braking when the traction Motor 24 is operating as a generator, electrical AC power from the motor 24 is converted to DC power by the PIM 22, which is then applied to the bus lines 16 and 18 to recharge the battery 14 and the capacitor 30. The blocking diode 44 prevents the regenerative electrical energy applied to the bus lines 16 and 18 from flowing into the fuel cell stack 12, which could otherwise damage the stack 12.

The fuel cell system 10 also includes a power management and distribution (PMD) system 26 electrically coupled to the bus lines 16 and 18 that converts the high voltage power on the bus lines 16 and 18 to a lower DC voltage or AC voltage suitable for auxiliary units 28, such as lights, heater, etc., in the vehicle.

The super capacitor 30 equalizes the voltage variation of the stack 12 during operation of the system 10 by providing voltage matching between the stack 12 and the battery 14. When the vehicle systems, such as the traction motor 24, are drawing minimal power from the power bus lines 16 and 18 during, for example, vehicle idling, the voltage on the bus lines 16 and 18 will be high (400V) from the stack voltage. As the vehicle power demand increases, the voltage potential on the lines 16 and 18 decreases. In the known systems, the DC/DC converter matched the voltage of the battery 14 to the voltage on the bus lines 16 and 18 as it changed to prevent large SOC swings of the battery 14. By eliminating the DC/DC converter and providing the super capacitor 30, as discussed above, the super capacitor 30 incurs the large state of charge swings, thus providing the voltage matching and isolating the battery 14 from the voltage swings. For an ideal capacitor, the SOC and the voltage is a direct relationship where $SOC=V_{actual}/V_{max}$, and also the voltage is directly dependent on the amount of charge stored in the capacitor 30 as $V=Q/C$ (Q=charge [As], C=capacity [F].

In one embodiment, the open circuit voltage (OCV) of the battery 14 is about 280 volts and the voltage of the super capacitor 30 is about 120 volts when fully charged. Therefore, the combination of the voltage of the super capacitor 30 and the battery 14 is about the same as the stack voltage during low power demands providing the voltage matching. As the power demand of the system 10 increases and the stack voltage decreases, the super capacitor 30 will begin to discharge, reducing its voltage. The voltage on the battery 14 will stay about the same minus the voltage drop across the battery resistance. When the power demand on the system 10 is at a maximum, the stack voltage will be about 280 volts, and the voltage on the super capacitor 30 will go to a complete discharge state. In this situation, the stack voltage matches the 280 volts of the battery 14. The battery 14 can still be used for vehicle start-up and shutdown even if the capacitor 30 is empty by by-passing current through the diode 40. Therefore, the system 10 benefits from the ability of the super capacitor 30 to provide large voltage and defined SOC swings and the large energy capacity of the battery 14.

In one embodiment, the battery 14 provides about ⅔ of the supplemental power needed for the system 10, and the super capacitor 30 provides about ⅓ of the supplemental power. For example, if the stack 12 provides 70 kW of power, the battery 14 may provide 20 kW of power and the super capacitor 30 may provide 10 kW of power to get to the desired 100 kW for the system 10. Additionally, the battery 14 may have an SOC swing of about 20% and the capacitor 30 may have an SOC swing of about 85%. Also, the power and energy rating of the super capacitor is significantly less than the power and energy rating of the battery, while both are rated for the same current.

A suitable diode/contactor/resistor network (not shown) in series with the battery 14 and the super capacitor 30 can be provided to avoid overcharges or overcurrent of the battery 14 and the capacitor 30. Further, the battery 14 can be used for start-up and shutdown of the system 10, even when the capacitor 30 is empty. Switched resistors 52 and 54 in parallel with the capacitor 30 or the battery 14, respectively, can be used to provide long term SOC equalization of the battery 14 or the capacitor 30 should the two storage systems have a different self discharge characteristic.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
    an electrical power bus line;
    a fuel cell stack electrically coupled to the power bus line;
    a battery electrically coupled to the power bus line; and
    a capacitor electrically coupled to the power bus line in series with the battery, said capacitor providing voltage matching for voltage swings on the power bus line.

2. The fuel cell system according to claim 1 further comprising a diode electrically coupled in parallel with the capacitor, said diode providing reverse voltage protection for the capacitor.

3. The fuel cell system according to claim 1 wherein the battery is selected from the group consisting of lithium batteries, nickel-metal-hydride batteries and lead-acid batteries.

4. The fuel cell system according to claim 1 wherein the capacitor is selected from the group consisting of super capacitors, double layer capacitors and ultra-capacitors.

5. The fuel cell system according to claim 1 wherein the battery provides about ⅔ of a predetermined supplemental power in addition to a fuel cell stack power and the capacitor provides about ⅓ of the predetermined supplemental power.

6. The fuel cell system according to claim 5 wherein the fuel cell stack provides about 70 kW of power, the battery provides about 20 kW of power and the capacitor provides about 10 kW of power.

7. The fuel cell system according to claim 1 wherein the capacitor has a state of charge swing of about 85% and the battery has a state of charge swing of about 20%.

8. The fuel cell system according to claim 1 further comprising a switched resistor electrical coupled in parallel with the capacitor or the battery to provide long-term state-of-charge equalization of the system.

9. The fuel cell system according to claim 1 further comprising an AC or DC traction motor system electrically coupled to the power bus line, said motor system providing a voltage on the power bus line during regenerative braking for recharging the battery and the capacitor.

10. The fuel cell system according to claim 1 wherein the fuel cell system is on a fuel cell hybrid vehicle.

11. A fuel cell system comprising:
    an electrical power bus line;
    a fuel cell stack electrically coupled to the power bus line;
    a battery electrically coupled to the power bus line in parallel with the fuel cell stack; and
    a super capacitor electrically coupled to the power bus line in series with the battery and in parallel with the fuel cell stack, said capacitor having a state of charge swing of about 85% so as to provide voltage matching to the power bus line determined by changes of stack voltage, wherein the battery provides about ⅔ of a predetermined supplemental power in addition to a fuel cell stack power and the super capacitor provides about ⅓ of the predetermined supplemental power.

12. The fuel cell system according to claim 11 further comprising a diode electrically coupled in parallel with the super capacitor, said diode providing reverse voltage protection for the capacitor.

13. The fuel cell system according to claim 11 wherein the battery is selected from the group consisting of lithium batteries, nickel-metal-hydride batteries and lead-acid batteries.

14. The fuel cell system according to claim 11 further comprising a switched resistor electrical coupled in parallel with the capacitor or the battery to provide long-term state-of-charge equalization of the system.

15. The fuel cell system according to claim 11 further comprising an AC or DC traction motor system electrically coupled to the power bus line, said motor system providing a voltage on the power bus line during regenerative braking for recharging the battery and the super capacitor.

16. The fuel cell system according to claim 11 wherein the fuel cell system is on a fuel cell hybrid vehicle.

17. A fuel cell system for a fuel cell hybrid vehicle, said system comprising:
    an electrical power bus line;
    a fuel cell stack electrically coupled to the power bus line;
    a battery electrically coupled to the power bus line; and
    a super capacitor electrically coupled to the power bus line in series with the battery, said super capacitor providing voltage matching for voltage swings on the power bus line; and
    an AC or DC traction motor system electrically coupled to the power bus line for driving the vehicle, said motor system providing a voltage on the power bus line during regenerative braking for recharging the battery and the super capacitor.

18. The fuel cell system according to claim 17 further comprising a diode electrically coupled in parallel with the capacitor, said diode providing reverse voltage protection for the capacitor.

19. The fuel cell system according to claim 17 wherein the battery is selected from the group consisting of lithium batteries, nickel-metal-hydride batteries and lead-acid batteries.

20. The fuel cell system according to claim 17 wherein the battery provides about ⅔ of a predetermined supplemental power in addition to the fuel cell stack power and the super capacitor provides about ⅓ of the predetermined supplemental power.

21. The fuel cell system according to claim 20 wherein the fuel cell stack provides about 70 kW of power, the battery provides about 20 kW of power and the super capacitor provides about 10 kW of power.

22. The fuel cell system according to claim 17 wherein the super capacitor has a state of charge swing of about 85% and the battery has a state of charge swing of about 20%.

23. The fuel cell system according to claim 17 further comprising a switched resistor electrical coupled in parallel with the capacitor or the battery to provide long-term state-of-charge equalization of the system.

\* \* \* \* \*